Figure 1:
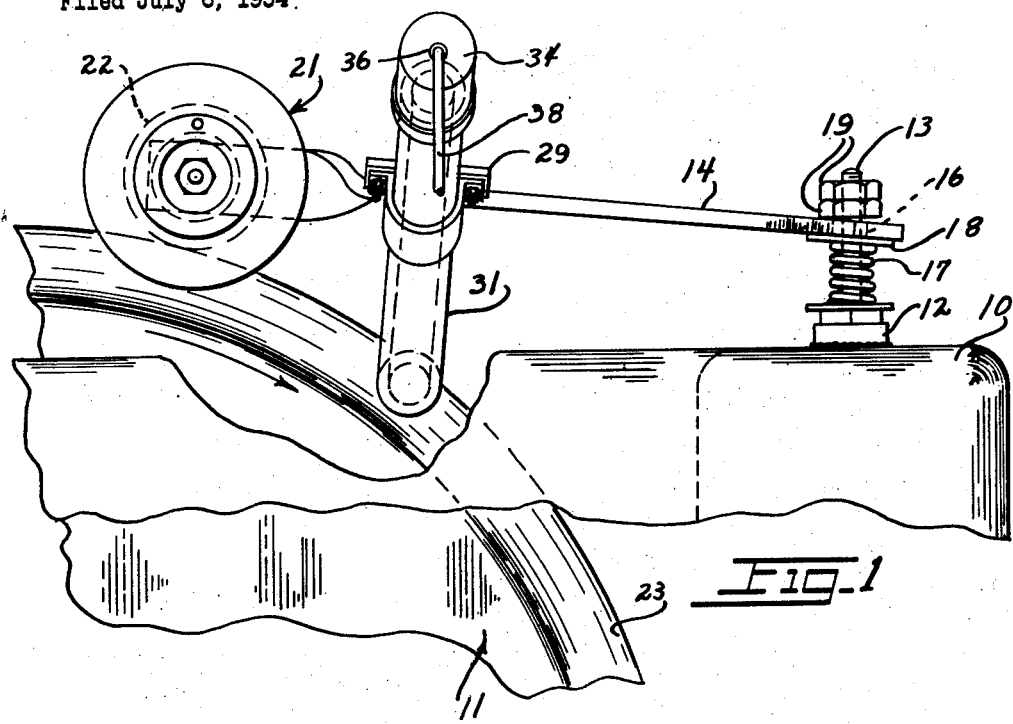

July 23, 1957 H. H. JONES ET AL 2,800,198
LOCOMOTIVE FLANGE LUBRICATOR
Filed July 6, 1954. 2 Sheets-Sheet 1

INVENTOR
HUGH H. JONES
FRANK E. DAVIDSON, JR.

BY Jennings & Carter
ATTORNEYS

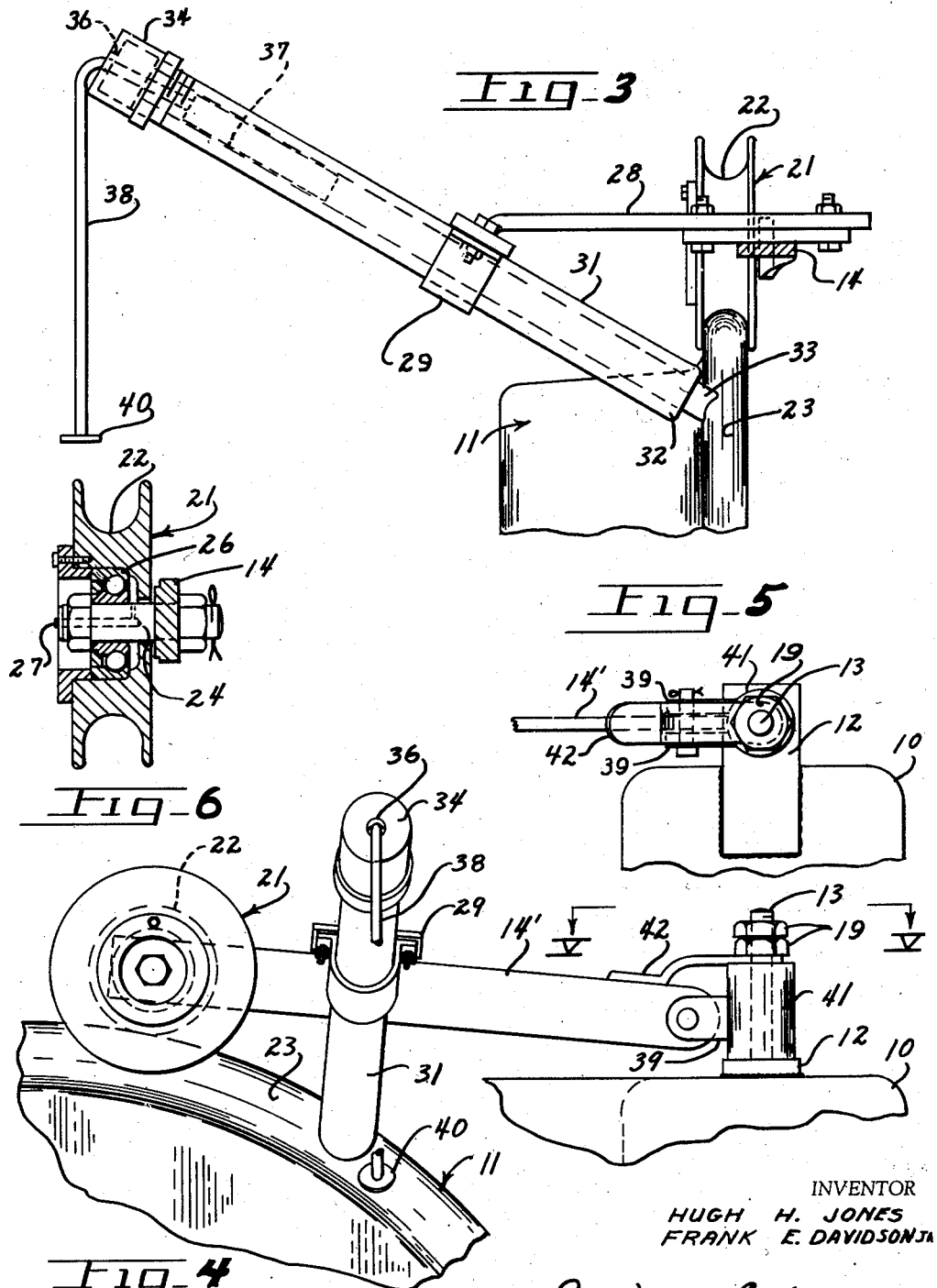

United States Patent Office 2,800,198
Patented July 23, 1957

2,800,198
LOCOMOTIVE FLANGE LUBRICATOR

Hugh H. Jones and Frank E. Davidson, Jr., Birmingham, Ala.

Application July 6, 1954, Serial No. 441,622

9 Claims. (Cl. 184—3)

This invention relates to a locomotive flange lubricator and has for some of its objects to provide a lubricator which shall be simple of design, reliable in operation, and embodying a minimum of moving parts.

A further object of our invention is to provide a locomotive flange lubricator adapted for using a stick, or solid, lubricant together with means for applying the lubricant to the flange of the locomotive with an even, uniform pressure, and at a constant, or uniform angle against the flange to be lubricated.

A still further object of our invention is to provide a locomotive flange lubricator which shall embody a roller mounted to ride on the flange to be lubricated and in association with a holder for a stick lubricant so mounted with relation to the roller that the lubricant holder is held in a constant angular position with respect to the flange to be lubricated.

As is well known in the art to which our invention relates, the wear on the flanges of the wheels of locomotives represents an item of great expense to railroads and presents a problem which is very difficult to overcome. Many devices have been heretofore proposed, none with which we are familiar, having provided an entirely satisfactory solution. One of the principal difficulties in lubricating the flanges of locomotive wheels is that most lubricants have the tendency to creep across the tread of the wheel bringing about slippage and thus greatly reducing the tractive power of the locomotive. In some, the lubricant was so applied that sand and other abrasives would be picked up and be mixed with the lubricant thus defeating the purpose of the lubricator. Other lubricators with which we are familiar were complicated of design, expensive of manufacture, and required constant attention in order to obtain satisfactory service.

In accordance with our invention these and other difficulties are overcome by providing a device adapted for use with a solid, or stick lubricant in which the lubricant is applied to the flange of the locomotive from a tube which is held at a constant angle with respect to the flange of the locomotive and is fed against the flange by the force of gravity brought about by a weight mounted in the outer end of the tube. The tube is mounted in a holder carried by an arm which is connected at one end to the frame of the locomotive by a flexible connection and which at its other end is provided with a flanged roller riding on the flange of the locomotive. The roller is yieldingly biased against the flange of the locomotive so that its position is constant with respect thereto and the tube containing the lubricant is held in a fixed relation to the flange to be lubricated and the lubricant is properly applied to the surface to be lubricated.

Figure 2:
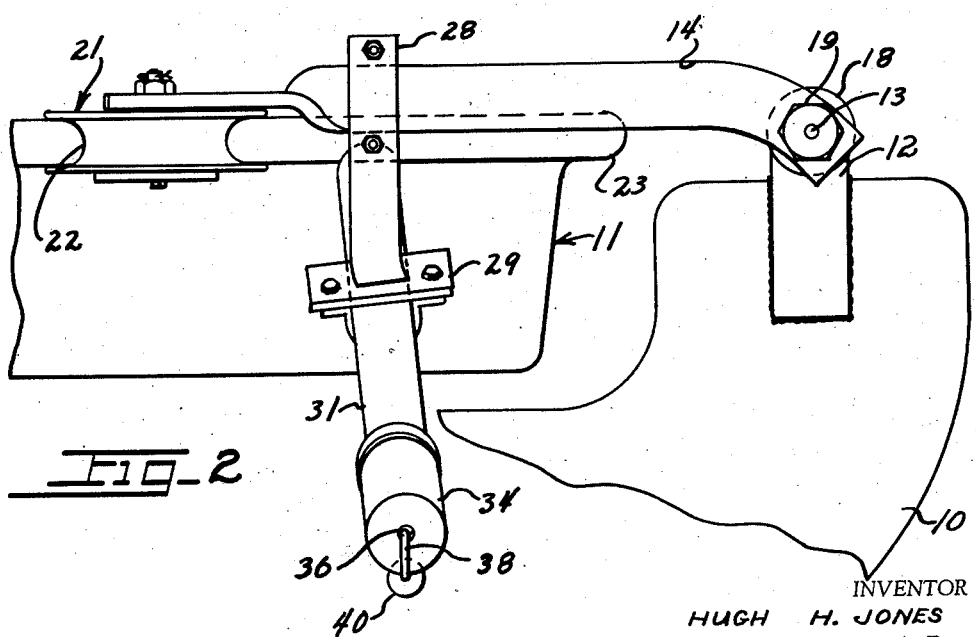

A device embodying features of our invention is illustrated in the accompanying drawings forming a part of this application in which:
Fig. 1 is a side elevational view;
Fig. 2 is a plan view;
Fig. 3 is a front elevational view;
Fig. 4 is a side view of a modification of the device;
Fig. 5 is a fragmentary plan view looking in the direction of the arrows V—V in Fig. 4; and
Fig. 6 is a detail sectional view of a roller adapted for use with our improved lubricator.

Referring now to the drawings for a better understanding of our invention, we show in Fig. 1 at 10, a fragment of the frame of a locomotive and at 11 one of the locomotive wheels which might be one of the leading or one of the trailing wheels of the locomotive, it being understood that one of these devices will be placed on each of the leading and perhaps on each of the trailing wheels. Mounted on the frame 10, as by welding, is a bracket 12 to which is secured an upstanding bolt 13. Mounted on the bolt 13 is an arm 14; the arm being provided with a hole 16 through which the bolt passes, which hole is larger in diameter than the diameter of the bolt 13 thereby to permit the arm to oscillate both in a vertical and in a horizontal plane with respect to the frame 10. Surrounding the bolt 13, below the arm 14 is a spring 17 which presses upwardly against the arm, a washer 18 being interposed between the spring and the arm. Nuts 19 are screwed down on the bolt 13 so that the effect of the spring 17 is to resist oscillation of the arm 14 upwardly. As will be readily apparent from the drawing, this support is such as to afford or permit oscillating movement of the arm 14 both in a horizontal and in a vertical plane, thus accommodating itself to all movements of the locomotive wheel relative to the frame 10.

On the other end of the arm 14 is a flanged roller 21 having a groove 22 therein which fits over the flange 23 of the locomotive wheel 11. Preferably the roller 21 rides on the flange in what is normally the down going side of the upper quadrant of the wheel. This is important on locomotives which travel at relatively high speeds as it aids in holding the roller in riding engagement with the wheel. The roller 21 is mounted on an axle 24 secured to the arm 14 and is preferably provided with a sealed anti-friction bearing 26. See Fig. 6. Means may be provided to lubricate the bearing through a passage 27 in the axle 24. As shown in Fig. 2 of the drawing, the arm 14 preferably extends directly over and parallel to the flange 23 and mounted on the arm, by any suitable means is a transverse arm 28, closely adjacent to the roller 21. On the outer end of the arm 28 we mount, by means of a clamping sleeve 29, a lubricant feed tube 31. The tube 31, as shown in Fig. 3 of the drawing, is preferably set at an angle of from 30° to 45° to the horizontal. The lower end of the tube, at 32, is positioned closely adjacent the flange 23, as shown in Fig. 3 of the drawing. In the tube 31 we place a stick of lubricant 33 which is preferably of the composition described and claimed in our copending application filed concurrently herewith. The stick is slightly smaller in diameter than the inner diameter of the tube 31 so as to feed freely downward. On the outer end of the tube 31 we place a cap 34 having a small hole 36 in the outer end thereof. Inside the tube 31, over the lubricant stick 33 we place a suitable weight 37, which, due to the motion of the locomotive when in operation, bears by gravity against the upper end of the stick 31 with a substantially constant pressure thus insuring feed of the lubricant against the flange 23 with a substantially constant pressure. A flexible member 38 is attached to the weight 37 with which to retract the weight in replenishing the lubricant 33. A button 40 on the end of the flexible member limits inward movement of the weight 37.

In Figs. 4 and 5 of the drawings, we show a modified form of our invention in which the arm 14' is pivotally mounted to a bracket 39 carried by a sleeve 41 which loosely surrounds the bolt 13 whereby the arm 14' is free to oscillate both in a horizontal and in a vertical plane. The arm is pressed downwardly by means of a leaf spring 42 which is mounted on the bolt 13, over the sleeve 41 and is held down against the sleeve by means of the nuts 19. By this means, the roller 21 is caused to ride on the flange 23, bearing against it with an even pressure so as to insure retaining its place when the locomotive is operating at relatively high speeds.

From the foregoing description the operation of our improved lubricator will be readily understood. The arm 14 with the roller 21 is biased downwardly by means of the spring 17 as shown in Fig. 1 or by the spring 42 shown in Fig. 4 and the roller is thus caused to remain in position on the flange 23 at all speeds of the locomotive. The arm 14 being free to oscillate in both a vertical and a horizontal plane holds the tube 31 and lubricant stick 33 in a uniform position relative to the flange 23. While the weight 37 insures the feeding of the stick 33 against the flange 23 with a uniform pressure.

It will be understood that the angle of inclination of the tube 31 may be varied by any suitable means to compensate for hardness of the stick 31 or for temperature, or for other conditions of service.

While we have shown our invention in but two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. A lubricator for the flanges of locomotive wheels, comprising as a separate attachment an arm pivotally mounted adjacent one end on a relatively stationary part of the locomotive and extending substantially over the locomotive wheel, a flanged roller adjacent the other end of the arm riding on the wheel flange and supporting said other end of the arm, and a tube for a solid type lubricant mounted on the arm and extending downwardly with its lower end closely adjacent the flange of the wheel.

2. A lubricator for the flanges of locomotive wheels, comprising as a separate attachment an arm pivotally mounted adjacent one end for limited universal movement on a relatively stationary part of the locomotive, a roller having flanges on both sides mounted on the arm and riding on the wheel flange thereby to support the arm, a tube for solid type lubricant carried by the arm at a point between the roller and the said mounted end and extending downwardly with its lower end closely adjacent the wheel flange, and means in the tube for biasing the lubricant downwardly against the flange.

3. A lubricator for the flange of a wheel adapted to run on a track comprising as a separate attachment, an arm mounted loosely adjacent one end on a relatively stationary member to oscillate in a horizontal and in a vertical plane adjacent the wheel, a roller having flanges on both sides mounted on the arm and riding continuously on the wheel flange and thereby supporting the other end of the arm, a tube for a solid lubricant stick carried by the arm closely adjacent the roller and extending downwardly with its lower open end closely adjacent the wheel flange, and a weight slidable in the tube and adapted to bear against the upper end of the lubricant stick and bias it downwardly toward the wheel flange.

4. A lubricator for the flanges of locomotive wheels, comprising as a separate attachment an arm loosely mounted for limited universal movement adjacent one end on a relatively stationary part of the locomotive to oscillate in a horizontal and in a vertical plane adjacent the locomotive wheel, a roller having flanges on both sides mounted on the arm and riding continuously on the wheel flange and thereby supporting the flange, a tube for a solid lubricant stick carried by the arm closely adjacent the roller and extending downwardly with its lower open end closely adjacent the wheel flange, a weight slidable in the tube and adapted to bear against the upper end of the lubricant stick and bias it downwardly toward the wheel flange, and means to limit downward movement of the weight.

5. A lubricator for the flanges of locomotive wheels, comprising as a separate attachment an arm loosely mounted adjacent one end on a relatively stationary part of the locomotive to oscillate in a horizontal and in a vertical plane adjacent the locomotive wheel, a roller having flanges on both sides mounted on the arm and riding on the wheel flange, a spring biasing the free end of the arm and the roller downwardly and holding the roller on the flange of the wheel, a tube for a solid lubricant stick carried by the arm closely adjacent the wheel flange, and a weight slidable in the tube and adapted to bear against the upper end of the lubricant stick and bias it downwardly toward the wheel flange.

6. Apparatus as defined in claim 5 in which the roller is mounted to ride on the upper down-going quadrant of the wheel flange.

7. For use in holding a stick of solid type lubricant always in contact with the working side of the wheel flange of a locomotive, a flanged roller disposed continuously to ride astride the wheel flange and lying substantially in the plane of the locomotive wheel, an arm adjacent one end of which the roller is mounted for rotation, means adjacent the opposite end of the arm connecting the same to a relatively stationary part of the locomotive for movement in vertical and horizontal planes whereby the roller remains on the flange as the wheel moves laterally and vertically of the said relatively stationary part of the locomotive, and a downwardly directed tube for said stick of lubricant connected to the arm between the ends thereof and having its lower end disposed adjacent the working side of the flange.

8. The combination with a flanged wheel mounted in a relatively stationary frame to roll along a track, of a lubricator for the flange of said wheel comprising a holder for a stick type lubricant, an arm supporting said holder at an angle to the flange to be lubricated, a bolt loosely connecting one end of the arm to the frame for vertical and horizontal oscillatory movement, and a flanged roller carried by the other end of the arm and riding on the wheel flange.

9. The combination with a flanged wheel mounted in a relatively stationary frame and bearing to roll along a track, of a lubricator for the flanges of said wheel comprising, an arm mounted at one end on said frame for vertical and horizontal oscillatory movement relative to the frame and extending over the flanged wheel, a roller having flanges on both sides mounted on the other end of said arm, a bracket mounted on said arm intermediate its ends, and a holder for a stick type lubricant mounted in said bracket and extending downwardly to a point adjacent the flange of the wheel and at an angle thereto.

References Cited in the file of this patent

UNITED STATES PATENTS

| | | |
|---|---|---|
| 824,873 | Keefe | July 3, 1906 |
| 1,092,738 | Miner | Apr. 7, 1914 |
| 2,580,687 | McMillan | Jan. 1, 1952 |
| 2,595,692 | Murphree | May 6, 1952 |
| 2,614,661 | Fisher | Oct. 21, 1952 |